Patented June 17, 1924.

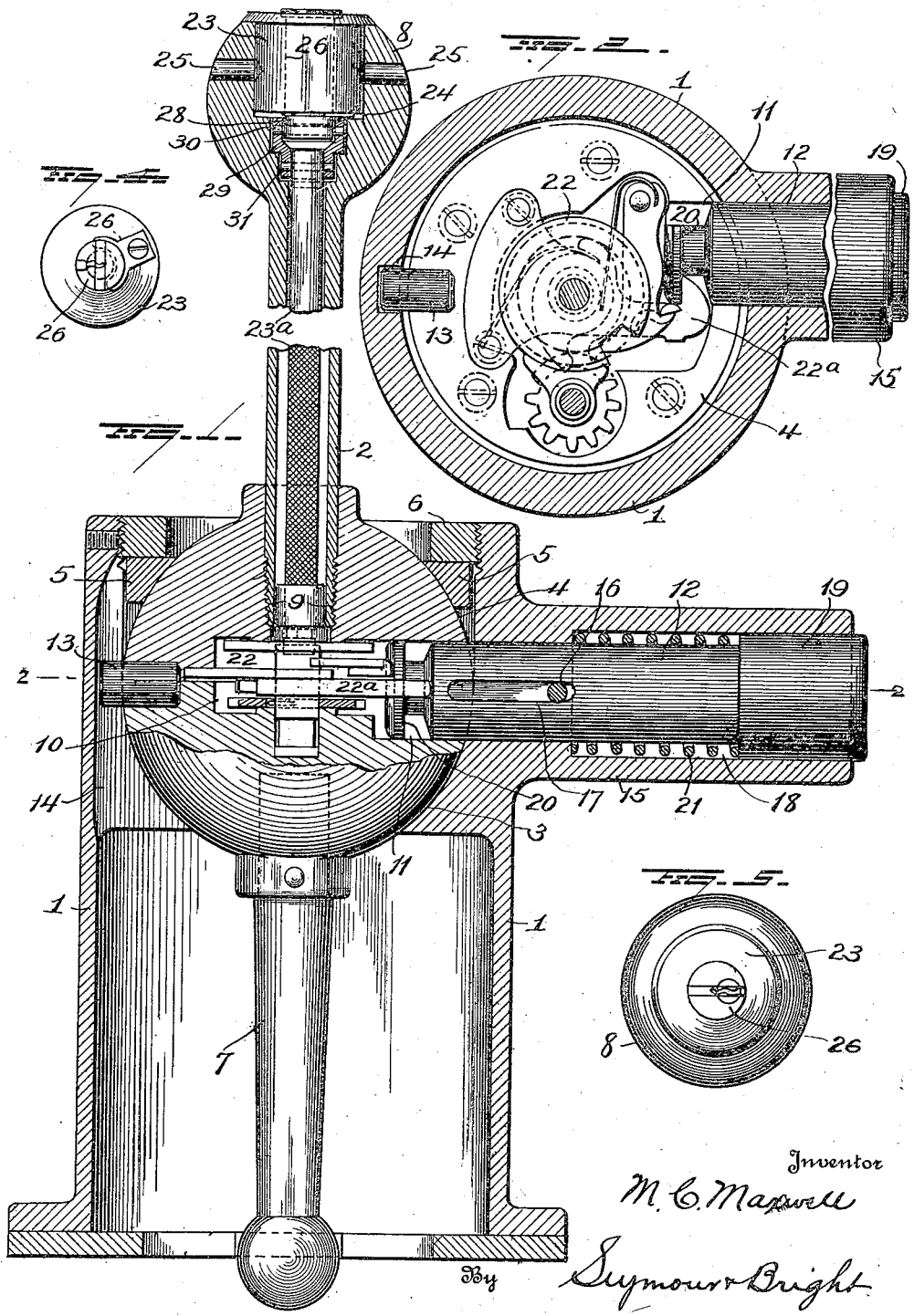

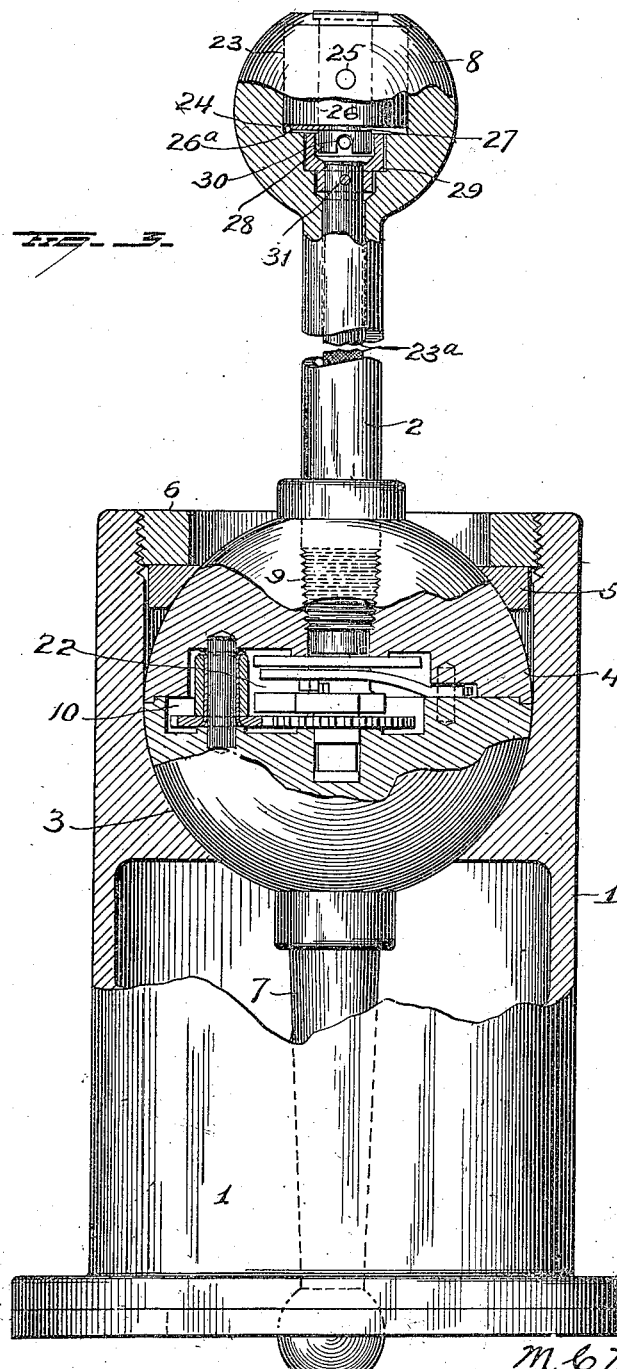

1,498,469

UNITED STATES PATENT OFFICE.

MAXWELL C. MAXWELL, OF STAMFORD, CONNECTICUT, ASSIGNOR TO THE YALE & TOWNE MANUFACTURING COMPANY, OF STAMFORD, CONNECTICUT.

LOCKING MEANS FOR LEVERS.

Application filed January 26, 1923. Serial No. 615,091.

*To all whom it may concern:*

Be it known that I, MAXWELL C. MAXWELL, a citizen of the United States, and a resident of Stamford, in the county of Fairfield and State of Connecticut, have invented certain new and useful Improvements in Locking Means for Levers; and I do hereby declare the following to be a full, clear, and exact description of the invention, such as will enable others skilled in the art to which it appertains to make and use the same.

This invention relates to improvements in locking means for levers, and more particularly to means for locking the transmission controlling lever for motor vehicles,—one object of my present invention being to provide locking means for a lever having a ball mounted for universal movement in a support which may constitute a part of the transmission casing of a motor vehicle, which locking means shall include a longitudinally movable bolt mounted in said support or transmission casing and adapted to enter said ball, and also lock-mechanism within said ball to engage the bolt and be operable and controlled by key-operated means carried by the handle portion of the lever.

With this and other objects in view, the invention consists in certain novel features and combinations of parts as hereinafter set forth and pointed out in the claims.

In the accompanying drawings;

Figure 1 is a sectional view of a control lever construction embodying my improvements; Figure 2 is a transverse sectional view; Figure 3 is a sectional view (partly in elevation) taken at right angles to Figure 1; Figure 4 is an inner end view of the cylinder lock, and Figure 5 is an end or plan view of the handle portion of the lever.

In the drawings, I have shown a cylindrical support 1 for the control lever 2 and this support may be in effect, a part of the transmission casing of a motor vehicle. The supporting member 1 is provided interiorly with a partly spherical seat 3 for the ball 4 of the control lever, the upper bearing for said ball being provided by a seat ring 5 held in place by a threaded ring 6. In the construction shown in the drawing, the control lever is provided with a lower or depending arm 7 secured to the ball 4, for operating the shifting devices of the transmission and the main or upper portion of the control lever is made tubular (for a purpose hereinafter described) and provided at its upper end with a handle portion or knob 8,—the lower end of said main portion preferably having threaded connection with the ball as shown at 9.

The ball member 4 of the lever is made in two separable parts which may be secured together by suitable fastening means, and the respective members of the ball are recessed in a manner to provide an internal cavity 10 open at one side to provide a socket 11 which permits the entrance of a longitudinally-movable or plunger bolt 12. Opposite the socket 11, a smaller socket may be provided in the ball 4 to receive a pin 13 which projects into a vertical groove 14 in the member 1.

A tubular arm 15 projects laterally from the supporting or transmission casing member 1 and provides a mounting for the plunger bolt 12, a pin 16 carried by the arm 15 and passing through an elongated slot 17 in the bolt, serving to guide the movements of the latter as well as to limit the longitudinal movements thereof. A portion of the tubular arm 15 is made with an enlarged bore 18 in which a head 19 at the outer end of the bolt is movable and from one end of which it projects, so as to be accessible for operation by the foot of the rider of the vehicle. The inner end portion of the bolt 12 which is adapted to enter the ball socket 11 to lock the lever against movement, is provided with a beveled head 20 for cooperation with locking mechanism 22 located within the cavity of the ball to lock said bolt against withdrawal from the ball. A coiled spring 21 surrounds the bolt 12 within the enlarged bore of the arm 15 and tends normally to force the bolt out of locked engagement with the ball of the lever, when released by the operation of the locking mechanism within the ball.

The locking mechanism 22 within the lever ball 4 may be such as shown and described in copending application filed on the 22nd day of December, 1922, and designated by Serial No. 608,444, except that in the present case, the combination tumbler mechanism of the previous application is omitted. The said locking mechanism 22 within the lever ball includes a hook bolt 22ª to engage the head 20 of the plunger bolt 12 to lock the latter against outward movement when its inner end is within the socket of the ball, as shown in Figures 1 and 2.

The locking mechanism within the ball is operated and controlled by a key-controlled lock 23 carried by the knob 8 of the lever and connected with said locking mechanism within the ball through the medium of a shaft 23ª extending through the tubular main portion of the lever,—which shaft is preferably of the flexible type.

In the embodiment of the invention shown in the drawing, the lock carried by the knob of the lever is of the cylinder type, and the knob 8 is made with a recess 24,—the casing of this lock being secured within the recess of the knob by suitable pins or fastening devices such, for example, as shown at 25. The plug 26 of the cylinder lock 23 may be retained from longitudinal movement by means of a small forked plate 26ª secured to the lock casing and entering an annular groove 27 in the depending lower end portion 28 of the plug. The lower end portion 28 of the plug is received by a sleeve 29 in which it is secured by a pin 30 and this sleeve also receives the upper end of the shaft 23ª to which it is secured by a pin 31. The sleeve 29 thus constitutes coupling means between the plug or rotatable member of the cylinder lock and the shaft 23ª which connects the latter with the locking mechanism within the ball 4 of the lever.

When the parts are in the locked positions shown in Figures 1 and 2, the lever will be locked to the supporting or transmission casing member 1 by reason of the plunger bolt entering said ball, and said bolt will be locked against unlocking movement by the locking mechanism within the ball. By operating the cylinder lock 23 with the use of a proper key, the turning of the plug member of said lock 23 will cause movement to be imparted through the medium of the shaft 23ª to the locking mechanism 22 within ball and cause the retracting of the hook bolt 22ª of the latter and hence the release of the bolt 12. The spring 21 will now be free to withdraw the bolt 12 and thus release the lever 2 to permit operation of the same.

In order to lock the lever 2, it is simply necessary that the bolt 12 shall be forced inwardly to cause it to enter the socket in the ball and become automatically locked by the hook bolt 22ª of the locking mechanism 22 within the lever ball. Such inward forcing of the bolt 12 may be readily accomplished by the foot of the rider.

Various changes might be made in the details of construction of my invention without departing from the spirit of the latter or limiting its scope and hence I do not wish to restrict myself to the precise details herein set forth.

Having fully described my invention what I claim as new and desire to secure by Letters-Patent, is:—

1. The combination with a lever and a mounting therefor, of a bolt carried by the mounting and adapted to enter the lever, locking means for said bolt located within the lever, and key controlled means carried by the lever for controlling the operation of said locking mechanism.

2. The combination with a lever having a ball, and a mounting for said ball, of a bolt carried by said mounting and adapted to enter said ball, locking mechanism for said bolt, located within said ball, and a lock carried by the handle portion of said lever and connected with said locking mechanism for controlling the operation of the latter.

3. The combination with a lever having a ball, and a mounting for the ball, of a bolt carried by said mounting and adapted to enter said ball, locking mechanism for said bolt, located within the ball, a cylinder lock mounted in the upper end portion of said lever, a shaft connecting the rotatable member of said cylinder lock with the locking mechanism within the ball, and means for retracting the bolt when released from the locking mechanism within the ball.

4. The combination with a lever provided at one end with a knob and having a ball provided with a socket, and a mounting for said ball, of a bolt carried by said mounting and adapted to enter the socket in the ball, a spring for retracting said bolt, locking mechanism for the bolt, located within said ball, a cylinder lock located in the knob of the lever, and a shaft housed in the lever and connecting the plug of the cylinder lock with the locking mechanism within the ball.

5. The combination with a lever having a socketed ball and provided at its upper end with a knob, and a mounting for said ball, of a spring-retracted bolt carried by said mounting and adapted to enter the ball, locking mechanism for said bolt, located within the ball, a cylinder lock carried by the knob of the lever, a shaft housed in said lever and connected at one end with the locking mechanism within the ball, and a coupling device connecting the other end of said shaft with the rotatable member of the cylinder lock in the knob of the lever.

In testimony whereof, I have signed this specification in the presence of two subscribing witnesses.

MAXWELL C. MAXWELL.

Witnesses:
L. M. SARSFIELD,
CHARLES A. BERRY.